UNITED STATES PATENT OFFICE.

BRUNO REICHELT, OF NEWARK, NEW JERSEY.

METHOD OF CONVERTING MEADOW OR SWAMP LAND INTO FERTILIZER.

1,134,760. Specification of Letters Patent. Patented Apr. 6, 1915.

No Drawing. Application filed May 2, 1913. Serial No. 765,049.

*To all whom it may concern:*

Be it known that I, BRUNO REICHELT, a citizen of the United States, residing at Newark, in the county of Essex and State of New Jersey, have invented certain new and useful Improvements in Methods of Converting Meadow or Swamp Land into Fertilizer, of which the following is a specification.

This invention relates to a fertilizer and process of making the same.

For a number of years meadow or swamp land, sometimes known as moor, marsh ground, boggy soil, marsh lark, and the like, usually found near ocean waters and lakes has heretofore gone to waste. This material is of a more or less felty nature and grows plants on its top surface. It contains in its substance tar, sulfur, tar oil, color, salt, potash and other ingredients.

It is the purpose of the present invention to make use of this land material for fertilizing purposes and the method by which the same is prepared in the present instance is to cut the land by hand or by means of a ditching and excavating machine and transport it in any suitable way to a coal heated furnace, placing the material preferably in a chamber of the furnace in position so as to keep the flames from the coal from coming into direct contact with the material. By thus heating the material dampness is removed therefrom and certain ingredients such as gases thrown off. During this process all insects inhabiting and growing life in the roots of the material are killed and the material is converted into a charcoal-like substance.

The chamber of the furnace is provided with outlets so as to permit the various chemicals or ingredients to pass off and be collected so as to be refined into salable substances. The potash and nourishing salts are particularly collected and refined for mixture with dried charcoal-like substance.

When the material has been sufficiently heated in the hermetically sealed chamber and cooled off it is removed therefrom in any suitable manner and by means of a suitable grinding machine the material is ground into a charcoal-like powder, and, in this condition, still contains such nourishing elements as to render it a high grade fertilizer. It is preferable, however, to take the potash and nourishing salts removed by the heating process and re-mix the same with the charcoal-like powder, thereby producing from this material which has heretofore gone to waste a high grade fertilizer.

Some of the ingredients drawn off from the material during the heating processes and particularly potash, which contains nourishing salts are collected and may be used for fertilizing purposes either alone or by combining the same with the material from which they have been previously drawn.

What is claimed it:—

1. The herein described method of converting meadow or swamp land material containing potash into fertilizer which consists in heating the same to dry it and to drive off the potash therefrom, then grinding the dried material and finally re-mixing the potash with the ground material.

2. The herein described method which consists in converting meadow or swamp land containing potash into fertilizer by cutting the same and subjecting it to the indirect action of heat to dry it and to drive off the potash therefrom, then grinding the material and finally re-mixing with the ground material the potash previously driven off.

3. The herein described method which consists in converting meadow or swamp land containing potash into fertilizer which consists in heating the same to drive off the potash, collecting the material thus driven off to use as a fertilizer and mixing the potash previously drawn off with the body of the material from which said potash has been drawn.

4. The herein described method of converting meadow or swamp land containing potash into fertilizer, which consists in cutting the land into strips, placing said strips into a furnace out of the path of the flames thereof, and driving off the potash contained therein, then grinding said material and finally remixing the same with the potash previously driven off.

In testimony whereof I affix my signature in presence of two witnesses.

BRUNO REICHELT.

Witnesses:
EMIL A. KERN,
PHILIPP CRAMER.

Copies of this patent may be obtained for five cents each, by addressing the "Commissioner of Patents, Washington, D. C."